(12) United States Patent
Wang et al.

(10) Patent No.: US 7,408,748 B2
(45) Date of Patent: Aug. 5, 2008

(54) SIDE READING REDUCED GMR FOR HIGH TRACK DENSITY

(75) Inventors: Po Kang Wang, San Jose, CA (US); Moris Dovek, San Jose, CA (US); Jibin Geng, Milpitas, CA (US); Tai Min, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 11/716,869

(22) Filed: Mar. 12, 2007

(65) Prior Publication Data

US 2007/0171571 A1    Jul. 26, 2007

Related U.S. Application Data

(62) Division of application No. 10/856,181, filed on May 28, 2004, now Pat. No. 7,203,039, which is a division of application No. 10/135,097, filed on Apr. 30, 2002, now Pat. No. 6,760,966.

(51) Int. Cl.
    *G11B 5/39* (2006.01)
(52) U.S. Cl. .................................. 360/324.12
(58) Field of Classification Search ................. 360/322, 360/324.12
    See application file for complete search history.

(56) References Cited

U.S. PATENT DOCUMENTS

| 5,583,725 | A | 12/1996 | Coffey et al. |
| 5,739,987 | A | 4/1998 | Yuan et al. |
| 5,742,459 | A * | 4/1998 | Shen et al. ............. 360/327.32 |
| 5,818,685 | A | 10/1998 | Thayamballi et al. |
| 6,185,078 | B1 | 2/2001 | Lin et al. |
| 6,198,608 | B1 | 3/2001 | Hong et al. |
| 6,219,207 | B1 * | 4/2001 | Pinarbasi ..................... 360/322 |
| 6,574,080 | B1 | 6/2003 | Sakaguci et al. |
| 7,050,273 | B2 * | 5/2006 | Horng et al. ............. 360/324.1 |
| 7,106,558 | B2 * | 9/2006 | Ju et al. ...................... 360/322 |
| 2002/0135947 | A1 * | 9/2002 | Aoki et al. .................. 360/322 |
| 2002/0186516 | A1 * | 12/2002 | Larson et al. .......... 360/324.12 |

FOREIGN PATENT DOCUMENTS

| JP | 08-221717 | 8/1996 |
| JP | 11-175928 | 7/1999 |
| JP | 00-276713 | 10/2000 |

* cited by examiner

*Primary Examiner*—Brian E Miller
(74) *Attorney, Agent, or Firm*—Saile Ackerman LLC; Stephen B. Ackerman

(57) ABSTRACT

As track density requirements for disk drives have grown more aggressive, GMR devices have been pushed to narrower track widths to match the track pitch of the drive width. Narrower track widths degrade stability and can cause amplitude loss and side reading. This problem has been overcome by placing an additional layer of soft magnetic material on the conductive layer. The added layer prevents flux leakage into the gap region. A non-magnetic layer must be included to prevent exchange coupling to nearby magnetic layers. In at least one embodiment the conductive leads are used to accomplish this. A process for manufacturing the device is also described.

5 Claims, 4 Drawing Sheets

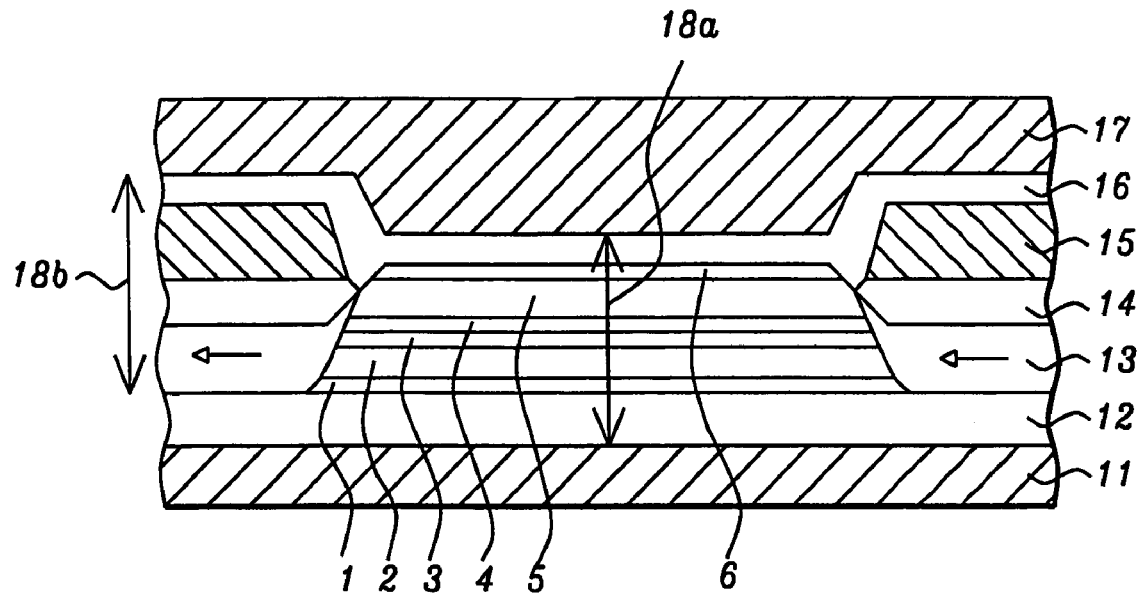
FIG. 1 – Prior Art
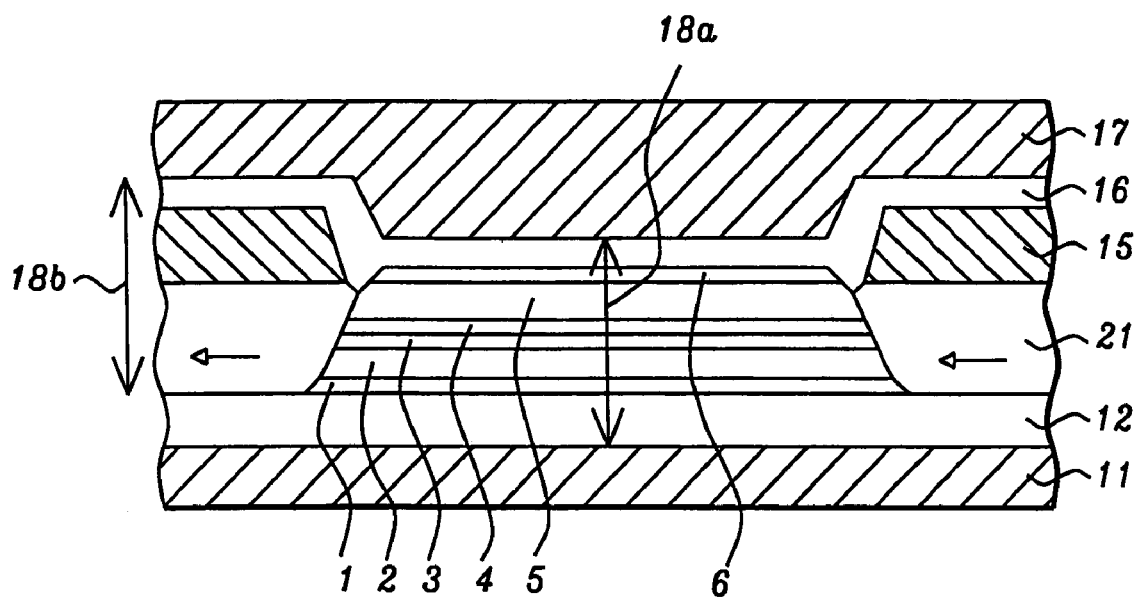
FIG. 2 – Prior Art

SIDE READING REDUCED GMR FOR HIGH TRACK DENSITY

This is a divisional application of U.S. Ser. No. 10/856,181 filed on May 28, 2004 now U.S. Pat. No. 7,203,039 which is a divisional of U.S. Ser. No. 10/135,097 filed on Apr. 30, 2002 (now issued as U.S. Pat. No. 6,760,966), which are herein incorporated by reference in their entirety.

FIELD OF THE INVENTION

The invention relates to the general field of read heads for magnetic disk systems with particular reference to flux leakage from the hard bias layers.

BACKGROUND OF THE INVENTION

The principle governing the operation of the read sensor in a magnetic disk storage device is the change of resistivity of certain materials in the presence of a magnetic field (MR or magneto-resistance). Magneto-resistance can be significantly increased by means of a structure known as a spin valve. The resulting increase (known as Giant magneto-resistance or GMR) derives from the fact that electrons in a magnetized solid are subject to significantly less scattering by the lattice when their own magnetization vectors (due to spin) are parallel (as opposed to anti-parallel) to the direction of magnetization of the solid as a whole.

Referring now to FIG. 1, the key elements of what is termed a top spin valve are, starting at the lowest level, seed layer 1, free magnetic layer 2, non-magnetic spacer layer 3, magnetically pinned layer 4, pinning layer 5, and capping layer 6. Inverted structures in which the free layer is at the top are also possible (and are termed bottom spin valves). To isolate the device from extraneous magnetic fields it is sandwiched between two magnetic shields 11 and 17. Also seen in FIG. 1 are the conductive leads 15 that attach to the device.

Although the layers enumerated above are all that is needed to produce the GMR effect, additional problems remain. In particular, there are certain noise effects associated with such a structure. As first shown by Barkhausen in 1919, magnetization in a layer can be irregular because of reversible breaking of magnetic domain walls, leading to the phenomenon of Barkhausen noise. The solution to this problem has been to provide a device structure conducive to single-domain films for the MR sensor and to ensure that the domain configuration remains unperturbed after processing and fabrication steps and during normal head operation. This is most commonly accomplished by giving the structure a permanent longitudinal bias provided by two opposing permanent magnets. In FIG. 1 the longitudinal bias is provided by a laminate of ferromagnetic layer 13 (typically nickel-iron) and antiferromagnetic layer 14. An alternative way to provide the longitudinal bias is to use a layer of a magnetically hard material. This is shown as layer 21 in FIG. 2.

As track density requirements for disk drives have grown more aggressive, GMR devices have been pushed to narrower track widths to match the track pitch of the drive and to thinner free layers to maintain high output in spite of the reduction in track width. Narrower track widths degrade stability as the device aspect ratio starts suffering. Thinner free layers have traditionally degraded stability and increased the asymmetry distribution across the slider population. Hardbias of the type described above, that is typically used to overcome stability concerns associated with the junction, also results in amplitude loss due to the field originating from the hard bias structure. Side reading, which is attributable to any deviation of the head microtrack profile from a square, also gets worse with narrower track widths With increased track density, the dead zone (which is defined as the area between the physical and magnetic read widths) in a conventional contiguous junction has been decreasing as the physical dimension has continued to shrink. At approximately 0.3 microns the dead zone becomes negative implying that the magnetic read width (MRW) is larger than the physical track width (PRW) dimension. Hence, for track width dimension of 0.3 microns and less, it is possible to retain more than half the readback amplitude with more than half the read head placed outside the written track.

This effect is due in part to the fact that the track width has been scaling down faster than other dimensions such as shield-to-shield (S-S) spacing (18a and 18b) and fly height. Shown in FIGS. 1 and 2 are, respectively, typical exchange bias and hard bias contiguous junctions in use with GMR devices. Modeling has shown that the side reading is reduced by using lower fly heights and thinner S-S. This implies that part of the side reading is due to the stripe edges and how they pick up flux from adjacent tracks. The topography for a typical head further increases the S-S spacing at track edges since the shield to shield (18b) needs to be increased to accommodate the lead and stabilization thickness.

A routine search of the prior art was performed with the following references of interest being found:

In U.S. Pat. No. 6,198,608, Hong et al. show a contiguous junction GMR device. U.S. Pat. No. 5,818,685 (Thayamballi et al.) construct a biasing magnet by using multiple layers of ferromagnetic material separated by non-magnetic layers. U.S. Pat. No. 6,185, 078 B1 (Lin et al.) and U.S. Pat. No. 5,739,987 (Yuan et al.) are related MR processes.

SUMMARY OF THE INVENTION

It has been an object of at least one embodiment of the present invention to provide a bottom spin valve having improved longitudinal bias relative to prior art devices.

Another object of at least one embodiment of the present invention has been that said bottom spin valve exhibit minimal amplitude loss due to fields originating from the hard bias structure.

Still another object of at least one embodiment of the present invention has been that said bottom spin valve exhibit minimal side reading, even with narrower track widths.

A further object of at least one embodiment of the present invention has been to provide a process for manufacturing said bottom spin valve.

These objects have been achieved by adding an additional layer of soft magnetic material above the hard biasing layer or layers. This layer provides flux closure to the hard bias layers thereby preventing flux leakage into the gap region. A non-magnetic layer must be included to prevent exchange coupling to the hard bias layers. In at least one embodiment the conductive leads are used to accomplish this. A process for manufacturing the device is also described.

BRIEF DESCRIPTION OF THE DRAWINGS

FIGS. 1 and 2 show read heads of the prior art that have less than perfect longitudinal bias.

DESCRIPTION OF THE PREFERRED EMBODIMENTS

The present invention compensates for the improper scaling of the head, which was discussed earlier, by introducing additional shielding into the lead structure. This is accomplished by depositing a thin NiFe layer whose thickness is comparable to that of one or two of the alumina insulators seen as 12 and 16 in all figures. The NiFe is placed between the leads and the antiferromagnet and it conducts the flux from the adjacent track directly into the actual shields (upper and lower) rather than allowing it to be picked up by the GMR sensor. This additional NiFe is stabilized by the exchange bias structure that is used to stabilize the device. Part of the excess flux from the tail is routed into this additional NiFe layer.

Figure 3:
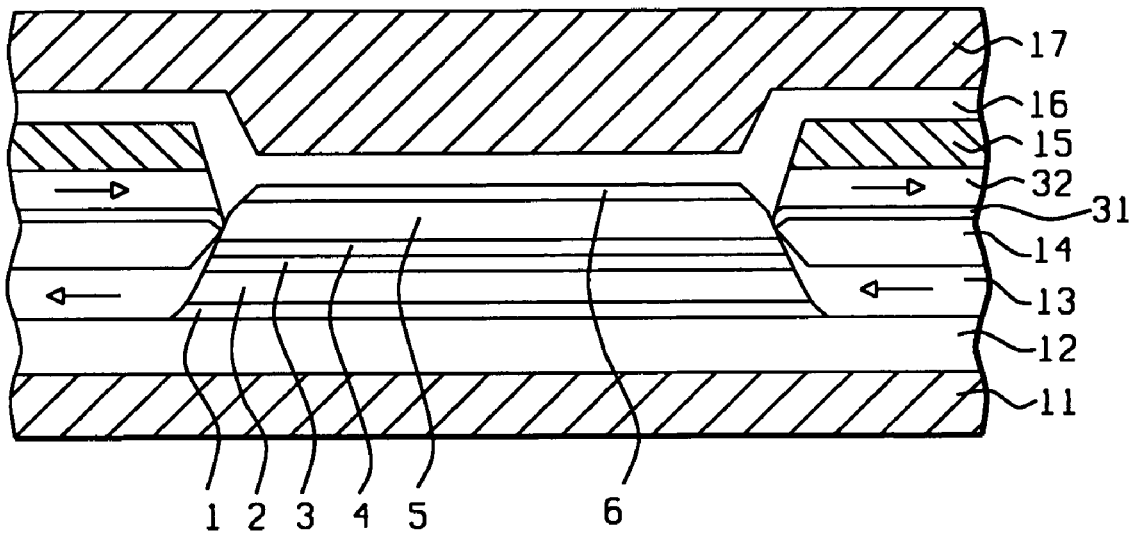
FIG. 3 shows a first embodiment of the invention.

We now describe a process for manufacturing the present invention. In the course of this description, the structure of the present invention will also become apparent. Referring now to FIG. 3, the process begins with the provision of lower magnetic shield 11 onto which is deposited insulator layer 12. A bottom spin valve (layers 1-5 as discussed earlier) is then formed on insulator layer 12. As seen in the figure, capping layer 6 is centrally located directly above antiferromagnetic (pinning) layer 5. These layers are then shaped (usually by ion milling) so that they have two opposing sides that slope downwards and away from capping layer 6.

Next, in a first embodiment, nickel iron layer 13 is deposited on the sloping sides. This is followed by deposition onto 13 of second antiferromagnetic layer 14 which is heated in a longitudinally oriented magnetic field so as to provide permanent longitudinal bias to the spin valve, as discussed earlier.

Now follows a key feature of the invention namely the deposition onto a layer 14 of non-magnetic layer 31, followed by the deposition of soft Ni—Fe layer 32 to a thickness between about 100 and 500 Angstroms, with 300 Angstroms being preferred. The purpose of layer 31 is to eliminate any exchange coupling between layers 14 and 32 so its thickness is between about 25 and 100 Angstroms, with 50 Angstroms being preferred. The structure is then magnetized in a direction that is anti-parallel to the magnetization direction of layer 13 by heating at a temperature between about 180 and 280% C in a magnetic field of between about 500 and 5,000 Oe for between about 0.5 and 5 hours. This added NiFe layer absorbs flux from the recording medium when the data track is placed anywhere under the leads, preventing the side track information from entering the GMR region thereby eliminating most of the side track reading from adjacent tracks. Only when the data track gets close to the physical track edge, the flux entering the GMR region starts getting stronger. This leads to a magnetic read width closer to the physical and therefore increases the dead zone, leading to a narrower track width.

Fabrication of the device is completed by depositing conductive lead layer 15 on Ni—Fe layer 32, following which upper insulator layer 16 is laid down followed by upper magnetic shield 17.

Figure 4:
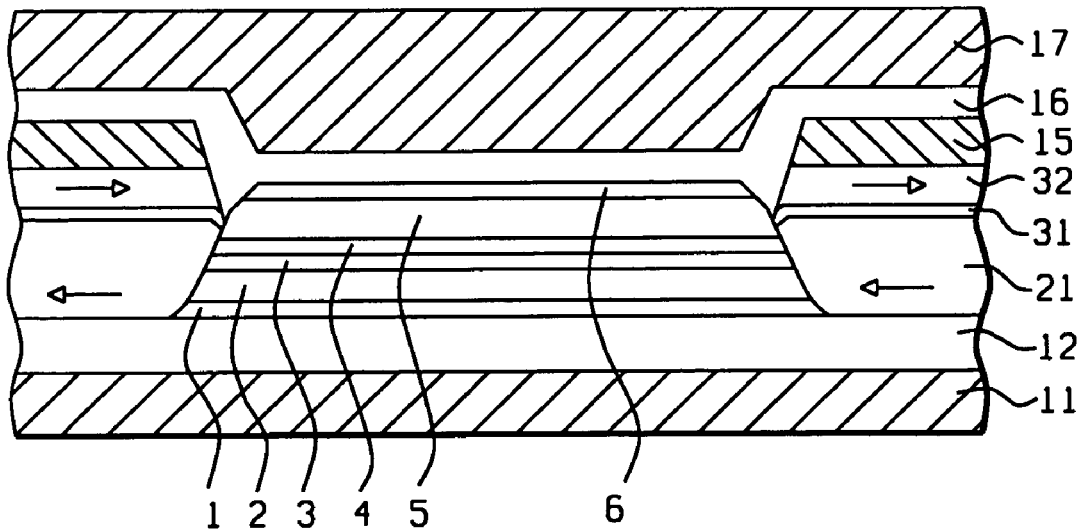
FIG. 4 shows a second embodiment of the invention.

Several variations on the above process are readily implemented. A second embodiment of the invention is illustrated in FIG. 4. It is similar to the first embodiment described above in all respects except that longitudinal bias is achieved by means of a single hard magnetic layer 21. Elimination of exchange coupling between layers 21 and 32 is still required so non-magnetic layer 31 (thickness between about 25 and 100 Angstroms, with 50 Angstroms being preferred) is still needed.

Figure 5:
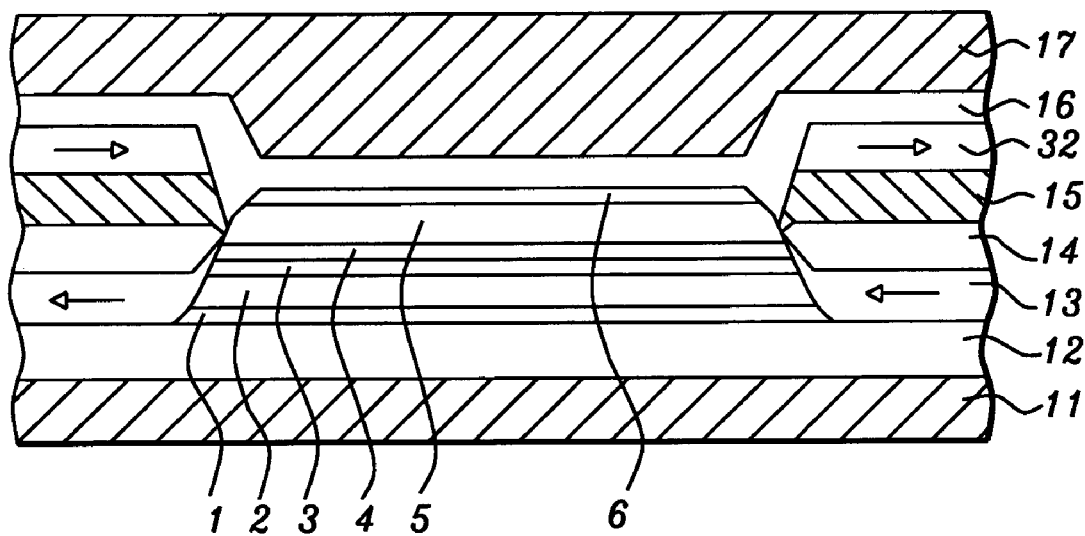
FIG. 5 shows a third embodiment of the invention.

A third embodiment of the invention is illustrated in FIG. 5. This embodiment is similar to the first embodiment except that conductive lead layer 15 is deposited directly onto antiferromagnetic layer 15 with soft Ni—Fe layer 32 being then deposited onto it. In this approach layer 15 acts as the exchange decoupling layer so layer 31 is no longer needed. The disadvantage (relative to the first embodiment) is the relatively larger distance between the soft NiFe layer and the physical edge of the GMR sensor. The larger the distance the larger will be the side shielding effect and hence the increase in the dead zone. We note here that layer 32 could also have been inserted into the middle of layer 15 just so long as a sufficient thickness of to remove exchange coupling is present.

Figure 6:
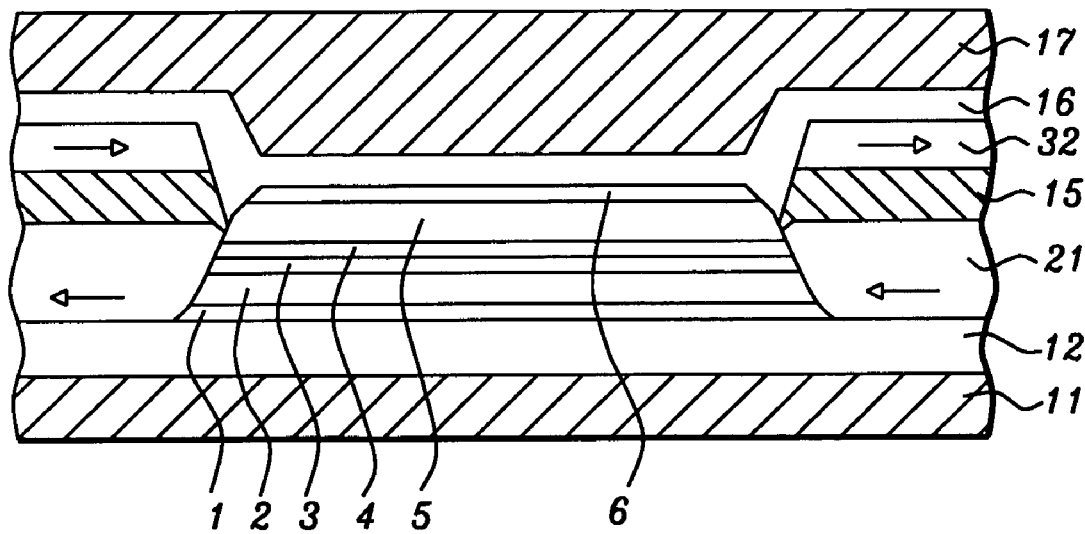
FIG. 6 shows a fourth embodiment of the invention.

The fourth embodiment that is shown in FIG. 6 also locates layer 32 above the conductive leads (as in the third embodiment) but it achieves longitudinal bias by means of hard magnetic layer 21 (as in the second embodiment).

Figure 7:
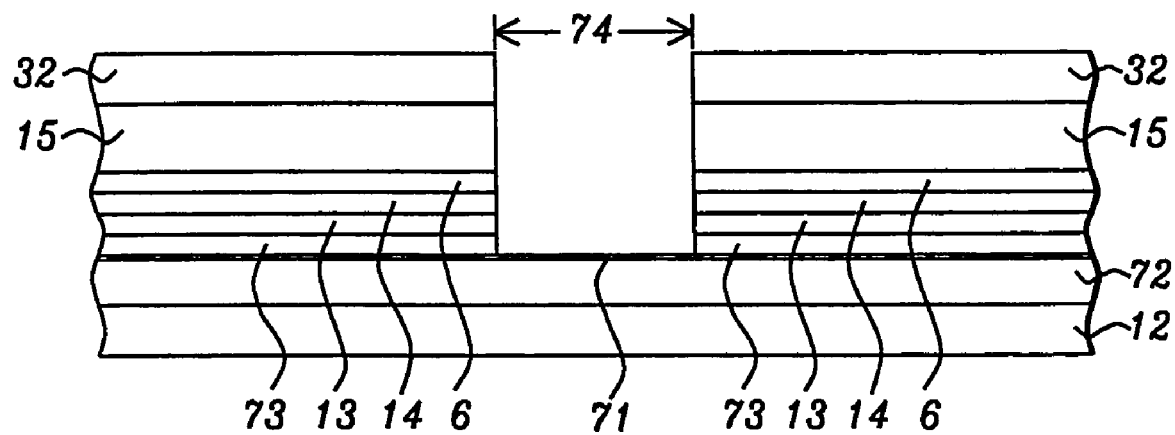
FIG. 7 shows a fifth embodiment of the invention

FIG. 7 shows a fifth embodiment in which free layer 71 of bottom spin valve 72 is left intact under the antiferromagnet/ferromagnet bilayer 14/13, separated therefrom by coupling layer 73. The latter is any one of several metals such as Cu, Ag, Ru, or Rh and is between about 2 and 20 Angstroms thick. Gap 74 defines the read width.

What is claimed is:

1. A magnetic read head, having a width, comprising:
   on a substrate, a bottom spin valve whose topmost layer is a magnetically free layer on which is a magnetic coupling layer;
   on said magnetic coupling layer, a first soft ferromagnetic layer on which is an antiferromagnetic layer;
   on said antiferromagnetic layer, a capping layer on which is a conductive lead layer;
   on said conductive layer, a second soft ferromagnetic layer; and
   a trench extending downward from said second ferromagnetic layer as far as said free layer, said trench having a width that defines said read head width.

2. The magnetic read head described in claim 1 wherein said first soft ferromagnetic layer is between about 5 and 75 Angstroms thick and is selected from the group consisting of nickel-iron, cobalt-iron, cobalt, and nickel.

3. The magnetic read head described in claim 1 wherein said second soft ferromagnetic layer is between about 100 and 500 Angstroms thick and is selected from the group consisting of nickel-iron, cobalt-iron, cobalt, and nickel.

4. The magnetic read head described in claim 1 wherein said coupling layer is between about 2 and 20 Angstroms thick and is selected from the group consisting of Cu, Ag, Ru, and Rh.

5. The magnetic read head described in claim 1 wherein said read head width is between about 0.05 and 0.2 microns.

* * * * *